(12) United States Patent
Huang et al.

(10) Patent No.: US 10,620,364 B2
(45) Date of Patent: Apr. 14, 2020

(54) DISPLAY DEVICE

(71) Applicant: Coretronic Corporation, Hsin-Chu (TW)

(72) Inventors: Pei-Ting Huang, Hsin-Chu (TW); Bing-Han Tsai, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/427,360

(22) Filed: May 31, 2019

(65) Prior Publication Data

US 2019/0369323 A1    Dec. 5, 2019

(30) Foreign Application Priority Data

Jun. 5, 2018 (CN) .......................... 2018 1 0567451

(51) Int. Cl.
*F21V 21/00*  (2006.01)
*F21V 8/00*  (2006.01)
*G09G 3/34*  (2006.01)
*G02F 1/13357*  (2006.01)
*G02F 1/1335*  (2006.01)

(52) U.S. Cl.
CPC ......... *G02B 6/0076* (2013.01); *G02B 6/0035* (2013.01); *G02F 1/1336* (2013.01); *G09G 3/3406* (2013.01); *G02F 2001/133626* (2013.01); *G09G 2320/066* (2013.01)

(58) Field of Classification Search
CPC ................ G02B 6/0078; G02B 6/0035; G02F 1/133615; G02F 2001/133626; G09G 3/3406; G09G 2320/066

USPC ................................. 362/613, 623, 625, 626
See application file for complete search history.

(56) References Cited

U.S. PATENT DOCUMENTS

| | | | | |
|---|---|---|---|---|
| 6,648,486 B2* | 11/2003 | Harbers | ............... | G02B 6/0036 362/613 |
| 8,714,802 B2* | 5/2014 | Chen | ....................... | G06F 3/041 362/606 |
| 2002/0163791 A1* | 11/2002 | Hoelen | ................ | G02B 6/0068 362/616 |
| 2013/0033901 A1* | 2/2013 | Nishitani | ............. | G02B 6/0036 362/613 |

FOREIGN PATENT DOCUMENTS

TW    I351562 B    11/2011

* cited by examiner

*Primary Examiner* — Laura K Tso

(57) ABSTRACT

A display device includes a backlight module and a display panel. The display panel includes a first display mode to display a first light transmissive pattern and a second display mode to display a second light transmissive pattern. The backlight module includes a first light guide plate having a plurality of first microstructures, a second light guide plate having a plurality of second microstructures, a first light source and a second light source. The first light source is configured to emit a first light beam into the first light guide plate, and the first light beam is emerged from the first light guide plate through the first microstructures. The second light source is configured to emit a second light beam into the second light guide plate, and the second light beam is emerged from the second light guide plate through the second microstructures.

9 Claims, 6 Drawing Sheets

DISPLAY DEVICE

CROSS-REFERENCE TO RELATED APPLICATION

This application claims the priority benefit of China application CN201810567461.5, filed on 2018 Jun. 5. The entirety of the above-mentioned patent application is hereby incorporated by reference herein and made a part of this specification.

FIELD OF THE INVENTION

The invention relates to an optical device, and more particularly to a display device.

BACKGROUND OF THE INVENTION

A liquid crystal display panel of a liquid crystal display device does not emit light, so a surface light source needs to be provided by a backlight module. The backlight module includes a direct type backlight module and a side-edge backlight module. A current common direct type backlight module is to dispose a plurality of LEDs arranged in a two-dimensional array under a diffusion plate. Although the direct type backlight module has better brightness uniformity, there is a problem of thick thickness. The current side-edge backlight module has a thinner thickness than the direct type backlight module because a LED strip is disposed on a side of a light guide plate.

However, regardless of the direct type backlight module or the side-edge backlight module, there is a problem that a contrast of a display image is not obvious enough. Although it can be improved by a technique of local dimming, the local dimming still cannot completely correspond to a pattern displayed on a display panel, causing light leakage in a non-pattern display area.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides a display device, which can improve the contrast of an image.

Other advantages and objects of the invention may be further illustrated by the technical features broadly embodied and described as follows.

In order to achieve one or a portion of or all of the objects or other objects, a display device provided in an embodiment of the invention includes a display panel and a backlight module. The display panel is disposed on a light exiting side of the backlight module. The display panel includes a first display mode and a second display mode. The display panel displays a first light transmissive pattern in the first display mode, and the display panel displays a second light transmissive pattern in the second display mode. The backlight module includes a first light guide plate, a second light guide plate, a first light source and a second light source. The first light guide plate has a first light incident surface, a first light exiting surface and a first bottom surface adjacent to the first light incident surface, and a plurality of first microstructures. The first microstructures are disposed on at least one of the first light exiting surface and the first bottom surface, and a distributed region of the first microstructures corresponds to the first light transmissive pattern. The second light guide plate is stacked on the first light guide plate, and has a second light incident surface, a second light exiting surface and a second bottom surface adjacent to the second light incident surface, and a plurality of second microstructures. The second microstructures are disposed on at least one of the second light exiting surface and the second bottom surface, and a distributed region of the second microstructures corresponds to the second light transmissive pattern. The first light source is disposed adjacent to the first light incident surface, and is configured to emit a first light beam into the first light guide plate, and the first light beam is emerged from the first light guide plate through the first microstructures. The second light source is disposed adjacent to the second light incident surface, and is configured to emit a second light beam into the second light guide plate, and the second light beam is emerged from the second light guide plate through the second microstructures.

In the embodiment of the invention, the distributed region of the first microstructures of the first light guide plate corresponds to the first light transmissive pattern, and the distributed region of the second microstructures of the second light guide plate corresponds to the second light transmissive pattern. When the first light beam is transmitted to the display panel through the first microstructures in the first display mode, a brightness of the first light transmissive pattern is improved, and a light leakage of a display area other than the first light transmissive pattern is reduced. When the second light beam is transmitted to the display panel through the second microstructures in the second display mode, a brightness of the second light transmissive pattern is improved, and a light leakage of a display area other than the second light transmissive pattern is reduced. Therefore, the contrast of the image of the display device can be improved in both the first display mode and the second display mode.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
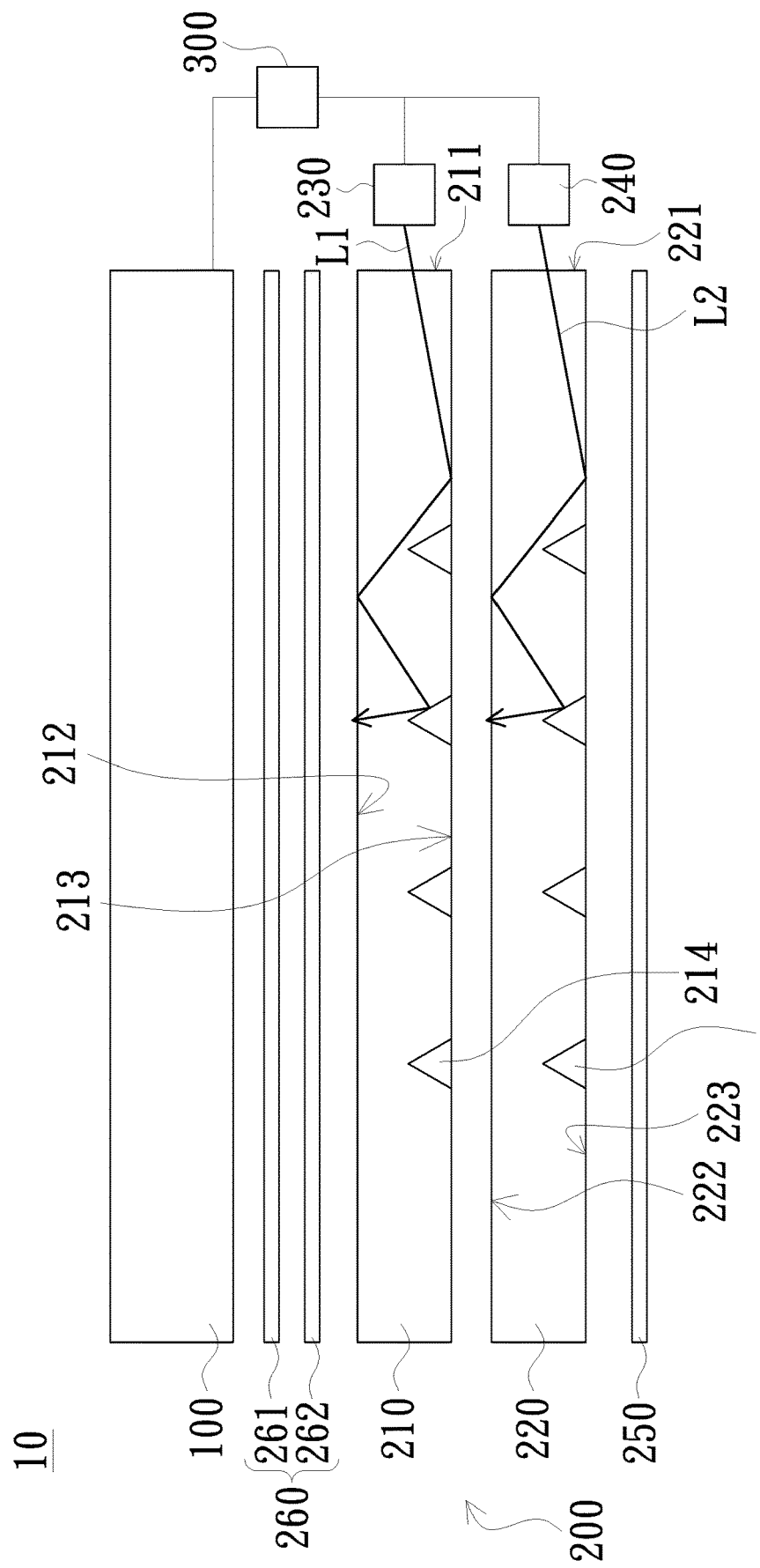
FIG. 1 is a schematic cross-sectional view of a display device of one embodiment of the invention.
Figure 2A:
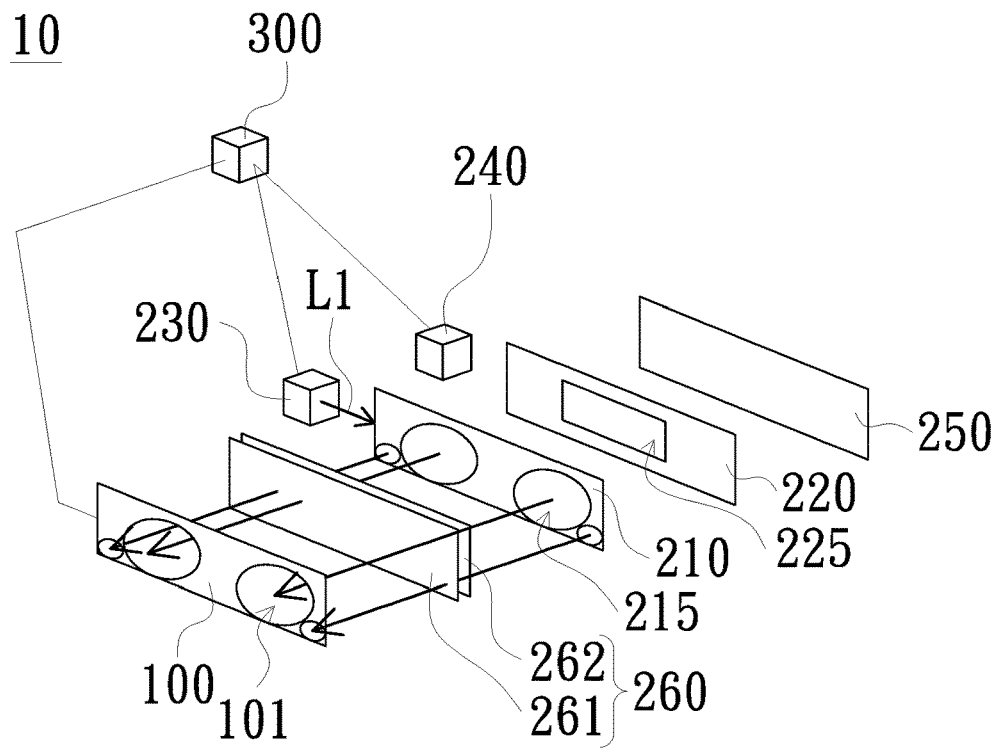
FIG. 2A is a schematic diagram of a display device in a first display mode in accordance with one embodiment of the invention.
Figure 2B:
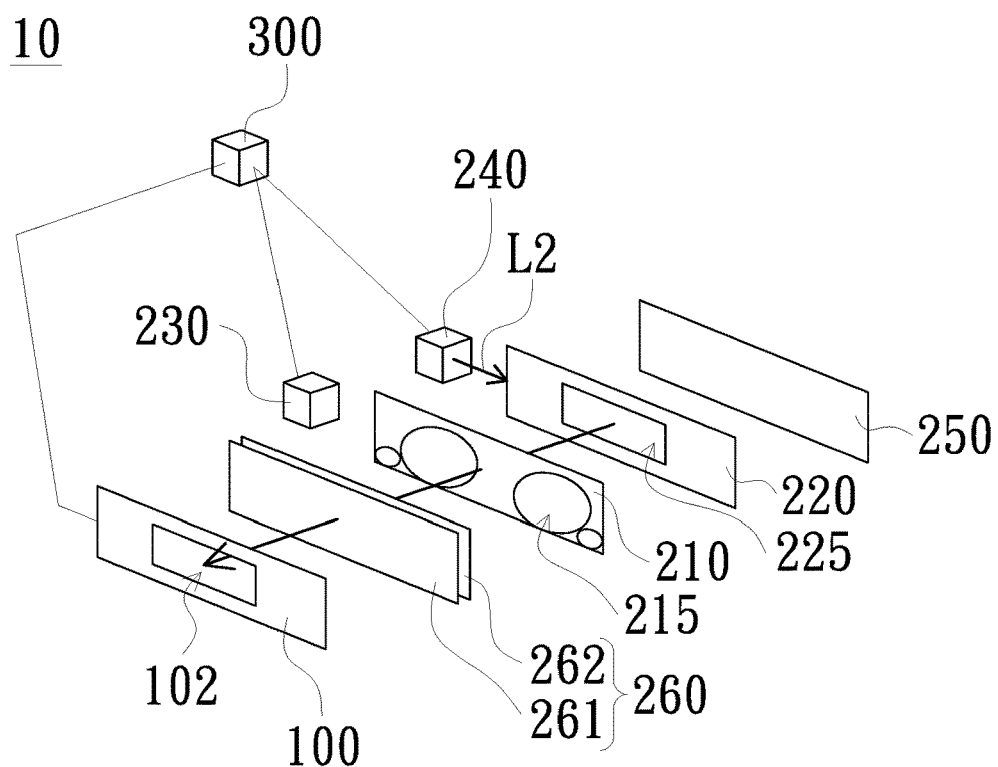
FIG. 2B is a schematic diagram of a display device in a second display mode in accordance with one embodiment of the invention.

FIG. 1 is a schematic cross-sectional view of a display device of one embodiment of the invention. FIG. 2A is a schematic diagram of a display device in a first display mode in accordance with one embodiment of the invention. FIG. 2B is a schematic diagram of a display device in a second display mode in accordance with one embodiment of the invention. Referring to FIG. 1, FIG. 2A and FIG. 2B, the display device 10 of the embodiment includes a display panel 100 and a backlight module 200. The display panel 100 is disposed on a light exiting side of the backlight module 200. The display panel 100 includes, for example, a first display mode and a second display mode. The backlight module 200 includes a first light guide plate 210, a second light guide plate 220, a first light source 230 and a second light source 240. The first light guide plate 210 has a first light incident surface 211, a first light exiting surface 212 and a first bottom surface 213 adjacent to the first light incident surface 211, and a plurality of first microstructures 214. The first microstructures 214 are, for example, distributed on the first bottom surface 213 of the first light guide plate 210. The second light guide plate 220 is stacked on the first light guide plate 210, and has a second light incident surface 221, a second light exiting surface 222 and a second bottom surface 223 adjacent to the second light incident surface 221, and a plurality of second microstructures 224. The second microstructures 224 are, for example, distributed on the second bottom surface 223 of the second light guide plate 220. The first light guide plate 210 is, for example, disposed between the second light guide plate 220 and the display panel 100, but is not limited thereto. The second light guide plate 220 may also be disposed between the first light guide plate 210 and the display panel 100. The first light source 230 is disposed adjacent to the first light incident surface 211, and is configured to emit a first light beam L1 into the first light guide plate 210 through the first light incident surface 211, and the first light beam L1 is emerged from the first light guide plate 210 through the first microstructures 214. The second light source 240 is disposed adjacent to the second light incident surface 221, and is configured to emit a second light beam L2 into the second light guide plate 220 through the second light incident surface 221, and the second light beam L2 is emerged from the second light guide plate 220 through the second microstructures 224. In addition, although the first microstructures 214 and the second microstructures 224 in FIG. 1 are illustrated by concave triangles, the invention does not particularly limit the pattern of the microstructures, as long as the function to transmit light out of the light guide plate can be achieved. For example, a microstructure having a planar reflecting surface or a curved reflecting surface.

The display panel 100 displays, for example, a first light transmissive pattern 101 in the first display mode (as shown in FIG. 2A), and the shape and position of a distributed region 215 of the first microstructures 214 correspond to the first light transmissive pattern 101. The display panel 100 displays, for example, a second light transmissive pattern 102 in the second display mode (as shown in FIG. 2B), and the shape and position of a distributed region 225 of the second microstructures 224 correspond to the second light transmissive pattern 102. The first light transmissive pattern 101 and the second light transmissive pattern 102 may be two patterns separated from each other on the display panel 100, or may be two patterns partially overlapping on the display panel 100, and are not limited thereto. In the embodiment, the first light transmissive pattern 101 is a plurality of circles having different sizes, and the second light transmissive pattern 102 is a rectangle, but not limited thereto. The first light transmissive pattern 101 and the second light transmissive pattern 102 may be any shape, or may be displayed in a single area of the display panel 100 or divided into a plurality of areas. The first light transmissive pattern 101 and the second light transmissive pattern 102 may, for example, have partial overlap. When the two have a partial overlap, the distributed region 215 of the microstructures 214 on the first light guide plate 210 and the distributed region 225 of the microstructures 224 on the second light guide plate 220 respectively correspond to the areas of the first light transmissive pattern 101 and the second light transmissive pattern 102. Therefore, the distributed region 215 where the first microstructures 214 are distributed and the distributed region 225 where the second microstructures 224 are distributed also have partial overlap. The correspondence between the microstructures and the light transmissive pattern will be exemplified by the first light guide plate 210 and the display panel 100.

Referring to FIG. 1 and FIG. 2A again, when the display panel 100 is switched to the first display mode, the display panel 100 displays the first light transmissive pattern 101. The first light source 230 emits the first light beam L1 into the first light guide plate 210, and the first light beam L1 is emerged from the first light guide plate 210 through the first microstructures 214 and is transmitted to the display panel 100. Since the shape and position of a distributed region 215 of the first microstructures 214 correspond to the first light transmissive pattern 101, a light shape of the first light beam L1 emitted from the first light guide plate 210 can be the same as the shape of the first light transmissive pattern 101. When the first light beam L1 is irradiated to the first light transmissive pattern 101, since the light shape of the first light beam L1 is the same as the shape of the first light transmissive pattern 101, the first light beam L1 is concentratedly irradiated on the first light transmissive pattern 101 to improve the brightness of the first light transmissive pattern 101, and the situation that the first light beam L1 is irradiated on the area of the display panel 100 that is not the first light transmissive pattern 101 can be reduced to reduce a light leakage of the display area other than the first light transmissive pattern.

Referring to FIG. 1 and FIG. 2B again, as described above, when the display panel 100 is switched to the second display mode, the display panel 100 displays the second light transmissive pattern 102. The second light source 240 emits the second light beam L2 into the second light guide plate 220, and the second light beam L2 is emerged from the second light guide plate 220 through the second microstructures 224 and is transmitted to the display panel 100. Since the shape and position of a distributed region 225 of the second microstructures 224 correspond to the second light transmissive pattern 102, a light shape of the second light beam L2 emitted from the second light guide plate 220 can be the same as the shape of the second light transmissive pattern 102. When the second light beam L2 is irradiated to the second light transmissive pattern 102, since the light shape of the second light beam L2 is the same as the shape of the second light transmissive pattern 102, the second light beam L2 is concentratedly irradiated on the second light transmissive pattern 102 to improve the brightness of the second light transmissive pattern 102, and the situation that the second light beam L2 is irradiated on the area of the display panel 100 that is not the second light transmissive pattern 102 can be reduced to reduce a light leakage of the display area other than the second light transmissive pattern.

The display device 10 further includes, for example, a control unit 300 electrically connected to the display panel 100, the first light source 230, and the second light source 240. When switching to the first display mode, the control unit 300 controls to turn on the first light source 230 and turn off the second light source 240 to irradiate the first light beam L1 to the first light transmissive pattern 101 through the distributed region 215 of the first microstructures 214. When switching to the second display mode, the control unit 300 controls to turn off the first light source 230 and turn on the second light source 240 to irradiate the second light beam L2 to the second light transmissive pattern 102 through the distributed region 225 of the second microstructures 224.

The display panel 100 is, for example, a liquid crystal display panel or other non-self-luminous display panel. The display panel 100 can include a plurality of display modes according to design requirements. The display panel 100 of the embodiment is exemplified by the first display mode and the second display mode, but is not limited thereto. In another embodiment, the display panel 100 may also include three display modes or more, that is, the first display mode, the second display mode, and the third display mode or more.

The first light source 230 and the second light source 240 are, for example, strip light sources including a plurality of point light sources, wherein the point light sources are, for example, light emitting diodes (LEDs), but not limited thereto. The first light source 230 and the second light source 240 may also be other kinds of strip light sources, such as light tubes, and the invention does not limit the type of the light source.

The backlight module 200 further includes, for example, a reflective sheet 250 disposed on a side of the second light guide plate 220 away from the first light guide plate 210 to reflect a light leaking from below the first light guide plate 210 and the second light guide plate 220 back into the first light guide plate 210 and the second light guide plate 220, thereby to improve light utilization efficiency. In addition, the backlight module 200 may further include at least one optical film 260, for example, two films (optical films 261, 262). The optical film 260 is, for example, a diffusion film or a brightness enhancement film, and is disposed between the display panel 100 and the first light guide plate 210 to improve the light brightness and the light uniformity of the backlight module 200, and the like.

In the display device 10 of the embodiment, the distributed region 215 of the first microstructures 214 of the first light guide plate 210 corresponds to the first light transmissive pattern 101, and the distributed region 225 of the second microstructures 224 of the second light guide plate 220 corresponds to the second light transmissive pattern 102. When the first light beam L1 is transmitted to the display panel 100 through the first microstructures 214 in the first display mode, a brightness of the first light transmissive pattern 101 is improved, and a light leakage of a display area that is not the first light transmissive pattern 101 is reduced. When the second light beam L2 is transmitted to the display panel 100 through the second microstructures 224 in the second display mode, a brightness of the second light transmissive pattern 102 is improved, and a light leakage of a display area that is not the second light transmissive pattern 102 is reduced. Therefore, the contrast of the image of the display device 10 can be improved in both the first display mode and the second display mode, so that the backlight module 200 of the embodiment can also exhibit a high dynamic range (HDR) effect on the display image without using dynamic local dimming.

In order to improve the contrast of the image, the quantity of types of the display modes needs to correspond to the quantity of light guide plates in the backlight module 200. For example, the display panel 100 of the embodiment includes a first display mode and a second display mode. The backlight module 200 includes a first light guide plate 210 and a second light guide plate 220 in a design architecture. In order to achieve a preferred display effect, the display panel 100 switches only between the first display mode and the second display mode, that is, only the first light transmissive pattern 101 and the second light transmissive pattern 102 are displayed, and no other display mode is included.

Figure 3A:
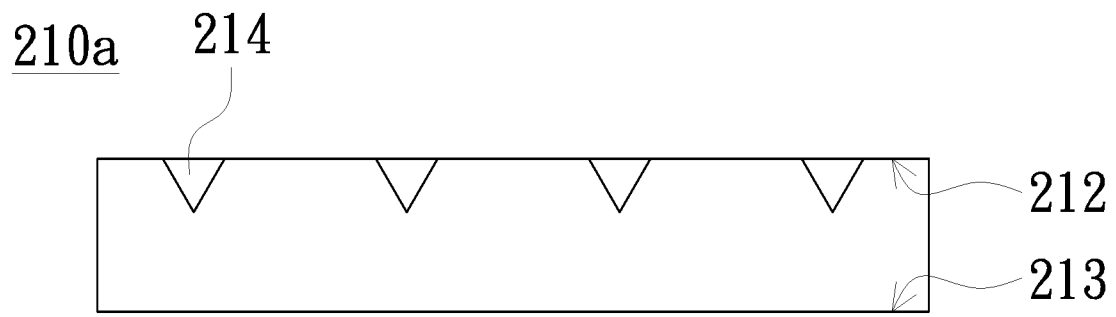
FIG. 3A and FIG. 3B are schematic diagrams showing distributions of first microstructures of another embodiment of the invention.
Figure 3B:
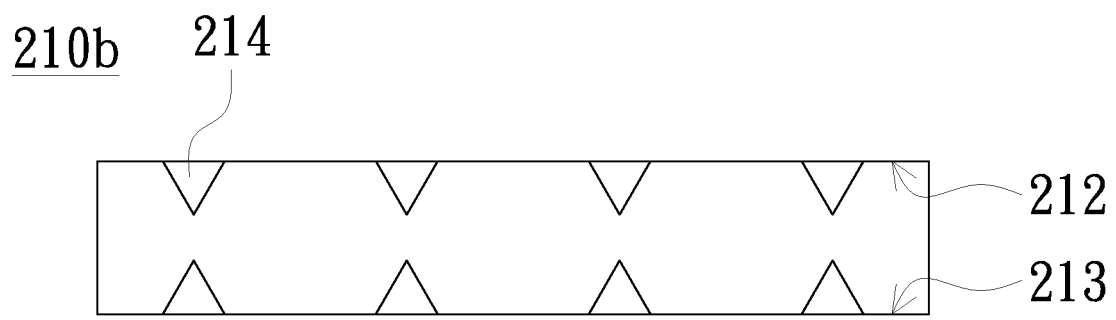

FIG. 3A and FIG. 3B are schematic diagrams showing distributions of first microstructures of another embodiment of the invention. Referring to FIG. 1, FIG. 3A and FIG. 3B, the first microstructures 214 are, for example, distributed on the first bottom surface 213 of the first light guide plate 210, but are not limited thereto. The first microstructures 214 may also be distributed on the first light exiting surface 212 of the first light guide plate 210a, or may be simultaneously distributed on the first bottom surface 213 of the first light guide plate 210b and the first light exiting surface 212 of the first light guide plate 210b, as shown in FIG. 3B. Since the positions where the second microstructures 224 may be distributed on the second light guide plate 220 are the same as that of the first microstructures 214, it will not be described again herein. However, in one embodiment, distribution positions of the second microstructures 224 on the second light guide plate 220 and distribution positions of the first microstructures 214 on the first light guide plate 210 may be different. For example, the second microstructures 224 are distributed on the second bottom surface 223, and the first microstructures 214 are distributed on the first light exiting surface 212. The distribution of the first microstructures 214 and the second microstructures 224 can be adjusted according to design requirements.

Figure 4:
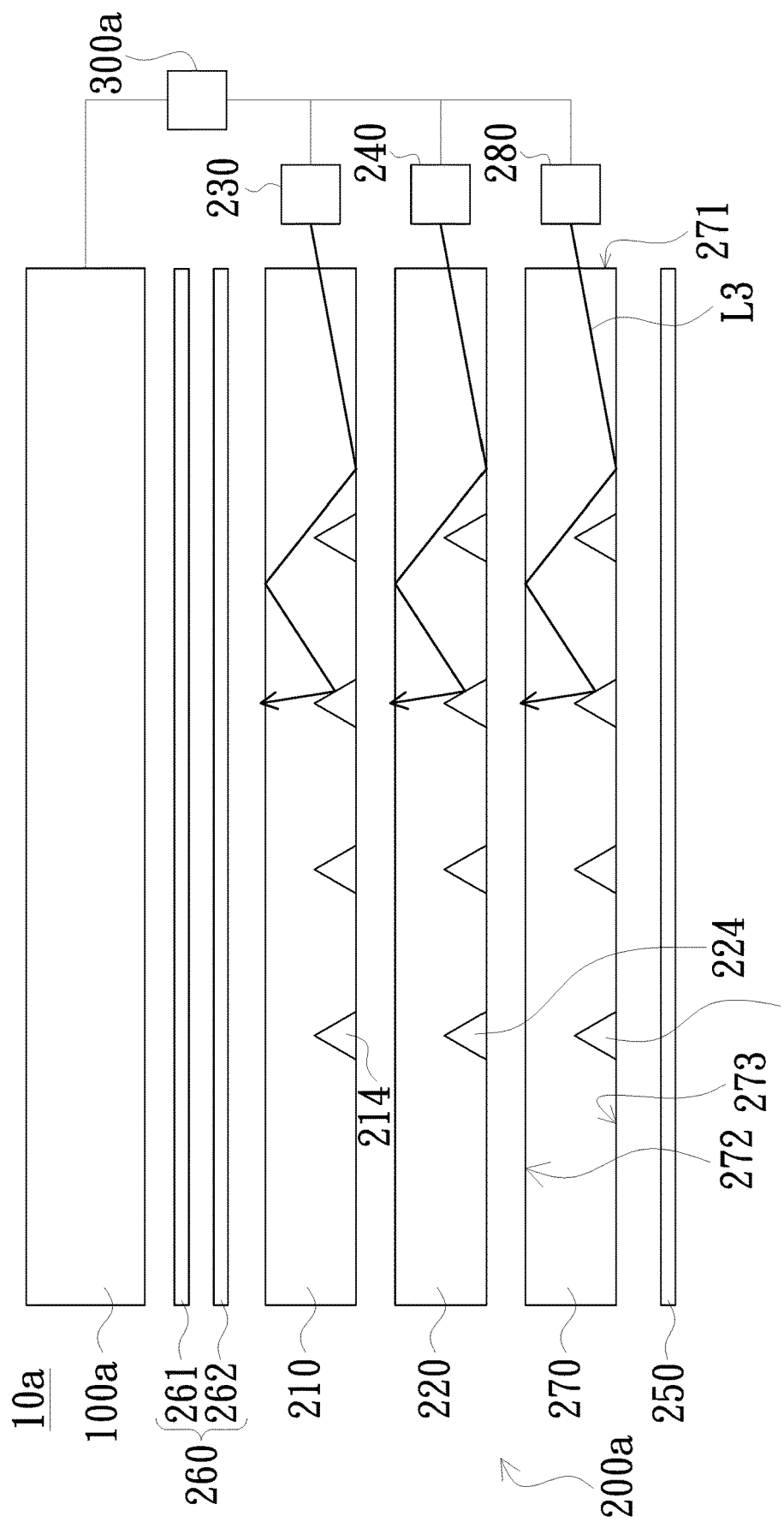
FIG. 4 is a schematic cross-sectional view of a display device of another embodiment of the invention.
Figure 5A:
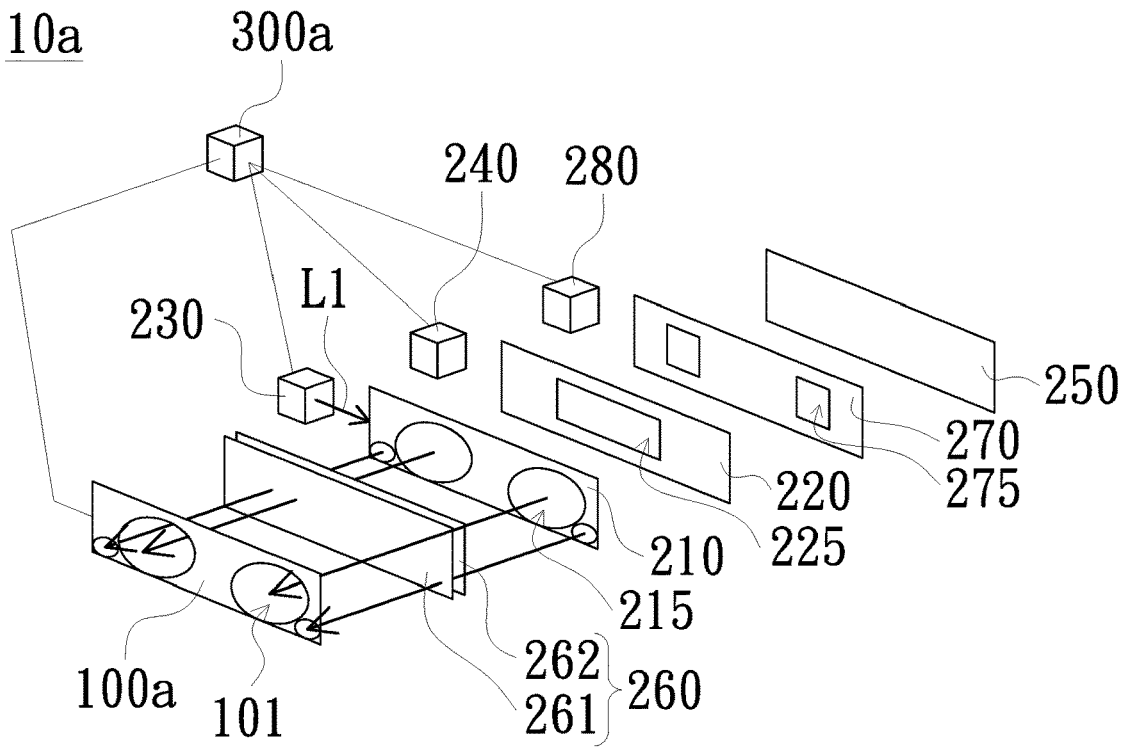
FIG. 5A is a schematic diagram of a display device in a first display mode in accordance with another embodiment of the invention.
Figure 5B:
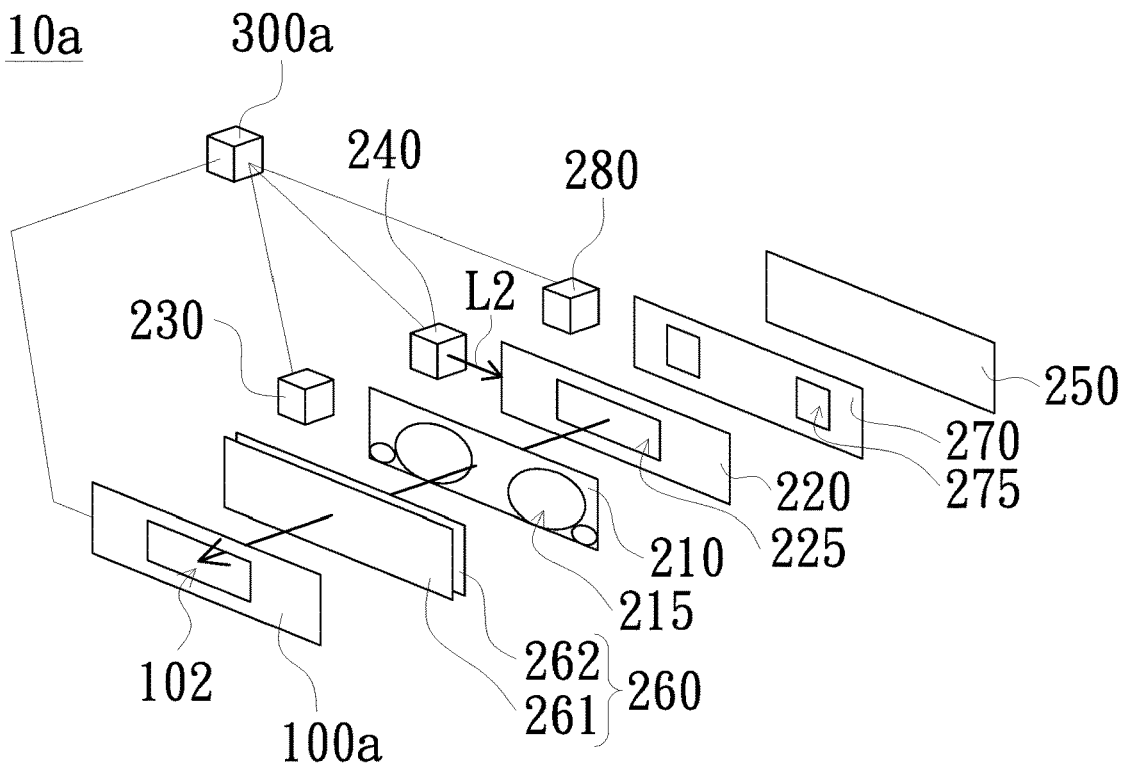
FIG. 5B is a schematic diagram of a display device in a second display mode in accordance with another embodiment of the invention.
Figure 5C:
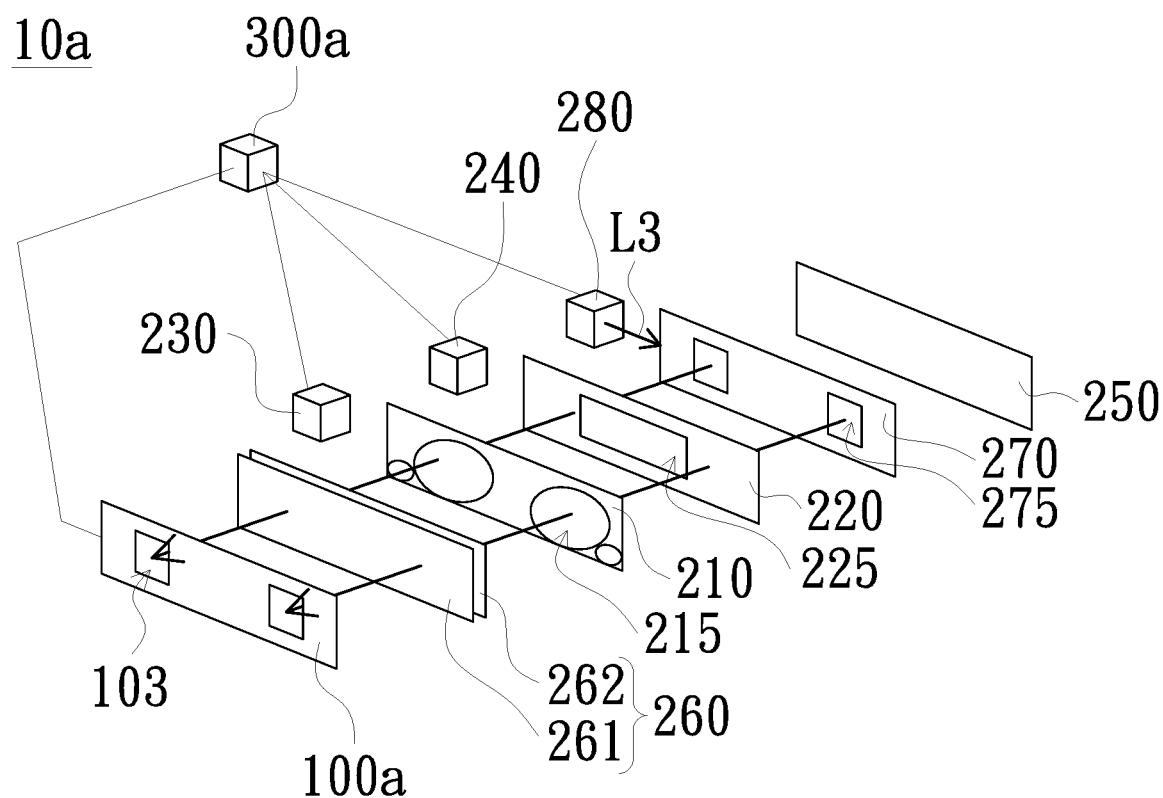
FIG. 5C is a schematic diagram of a display device in a third display mode in accordance with another embodiment of the invention.

FIG. 4 is a schematic cross-sectional view of a display device of another embodiment of the invention. FIG. 5A is a schematic diagram of a display device in a first display mode in accordance with another embodiment of the invention. FIG. 5B is a schematic diagram of a display device in a second display mode in accordance with another embodiment of the invention. FIG. 5C is a schematic diagram of a display device in a third display mode in accordance with another embodiment of the invention. Referring to FIG. 4, FIG. 5A, FIG. 5B and FIG. 5C, the display device 10a of the embodiment is similar in structure and advantages to the display device 10. The only difference is that the display panel 100a of the embodiment further includes a third display mode. The display panel 100a displays a third light transmissive pattern 103 in the third display mode. The backlight module 200a further includes a third light guide plate 270 and a third light source 280. The third light guide plate 270 is stacked on the first light guide plate 210 and the second light guide plate 220. In the embodiment, the first light guide plate 210 is, for example, disposed between the second light guide plate 220 and the display panel 100, and the third light guide plate 270 is, for example, disposed on a side of the second light guide plate 220 away from the first light guide plate 210, but is not limited thereto. The third light guide plate 270 has a third light incident surface 271, a third light exiting surface 272 and a third bottom surface 273 adjacent to the third light incident surface 271, and a plurality of third microstructures 274. The third light source 280 is disposed adjacent to the third light incident surface 271, and is configured to emit a third light beam L3 into the third light guide plate 270, and the third light beam L3 is emerged from the third light guide plate 270 through the third microstructures 274.

The display panel 100a displays, for example, a third light transmissive pattern 103 in the third display mode (as shown in FIG. 5C), and the shape and position of a distributed region 275 of the third microstructures 274 correspond to the third light transmissive pattern 103. The third microstructures 274 of the embodiment are, for example, distributed on the third bottom surface 273 of the third light guide plate 270, but are not limited thereto. The positions where the third microstructures 274 may be distributed on the third light guide plate 270 are the same as that of the first microstructures 214 and the second microstructures 224 and will not be described again herein.

The third light transmissive pattern 103 may also, for example, partially overlap with at least one of the first light transmissive pattern 101 and the second light transmissive pattern 102. When there is partial overlap, since the microstructures on the light guide plate correspond to the area of the light transmissive pattern, the distributed region 275 of the third microstructures 274 may also partially overlap with at least one of the distributed region 215 of the first microstructures 214 and the distributed region 225 of the second microstructures 224.

In the case that the display panel 100a further includes a third display mode, and the backlight module 200a further includes the third light guide plate 270 and the third light source 280, the control unit 300a may further be electrically connected to the third light source 280. When the display panel 100a is switched to the third display mode, the control unit 300a controls to turn off the first light source 230 and the second light source 240 and turn on the third light source 280.

In summary, in the display device of the embodiment of the invention, the shape and the position of the distribution region of the first microstructures of the first light guide plate correspond to the first light transmissive pattern, and the shape and the position of the distribution region of the second microstructures of the second light guide plate correspond to the second light transmissive pattern. When the first light beam is transmitted to the display panel through the first microstructures in the first display mode, a brightness of the first light transmissive pattern is improved, and a light leakage of a display area that is not the first light transmissive pattern is reduced. When the second light beam is transmitted to the display panel through the second microstructures in the second display mode, a brightness of the second light transmissive pattern is improved, and a light leakage of a display area that is not the second light transmissive pattern is reduced. Therefore, the contrast of the image of the display device can be improved in both the first display mode and the second display mode, so that the backlight module of the embodiment of the invention can also exhibit a high dynamic range effect on the display image without using dynamic local dimming.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first display mode, the second display mode, the third display mode, the first light guide plate, the second light guide plate, the third light guide plate, the first light source, the second light source, the third light source, the first light transmissive pattern, the second light transmissive pattern, the third light transmissive pattern, the first light incident surface, the second light incident surface, the third light incident surface, the first light exiting surface, the second light exiting surface, the third light exiting surface, the first bottom surface, the second bottom surface, the third bottom surface, the first microstructures, the second microstructures, the third microstructures, the first light beam, the second light beam and the third light beam are only used for distinguishing various elements and do not limit the number of the elements.

What is claimed is:

1. A display device, comprising a display panel, a backlight module and a control unit, wherein:
   the display panel is disposed on a light exiting side of the backlight module, the display panel comprises a first display mode and a second display mode, the display panel displays a first light transmissive pattern in the first display mode, and the display panel displays a second light transmissive pattern in the second display mode;
   the backlight module comprises:
      a first light guide plate, having a first light incident surface, a first light exiting surface and a first bottom surface adjacent to the first light incident surface, and a plurality of first microstructures, wherein the first microstructures are disposed on at least one of the first light exiting surface and the first bottom surface, and a distributed area of the first microstructures corresponds to the first light transmissive pattern;
      a second light guide plate, stacked on the first light guide plate and having a second light incident surface, a second light exiting surface and a second bottom surface adjacent to the second light incident surface, and a plurality of second microstructures, wherein the second microstructures are disposed on at least one of the second light exiting surface and the second bottom surface, and a distributed area of the second microstructures corresponds to the second light transmissive pattern;
      a first light source, disposed adjacent to the first light incident surface and configured to emit a first light beam into the first light guide plate, wherein the first light beam is emerged from the first light guide plate by the first microstructures; and
      a second light source, disposed adjacent to the second light incident surface and configured to emit a second light beam into the second light guide plate, wherein the second light beam is emerged from the second light guide plate by the second microstructures; and
   the control unit is electrically connected to the display panel, the first light source, and the second light source, when switching to the first display mode, the control unit controls to turn on the first light source and turn off the second light source, and when switching to the second display mode, the control unit controls to turn off the first light source and turn on the second light source.

2. The display device according to claim 1, wherein the first light guide plate is disposed between the second light guide plate and the display panel.

3. The display device according to claim 2, wherein the backlight module further comprises at least one optical film disposed between the display panel and the first light guide plate.

4. The display device according to claim 2, wherein the backlight module further comprises a reflective sheet disposed on a side of the second light guide plate away from the first light guide plate.

5. The display device according to claim 1, wherein the first light transmissive pattern and the second light transmissive pattern have partial overlap.

6. The display device according to claim 5, wherein a distributed region of the first microstructures and a distributed region of the second microstructures have partial overlap.

7. The display device according to claim 1, wherein the display panel further comprises a third display mode, the display panel displays a third light transmissive pattern in the third display mode, the backlight module further comprises a third light guide plate and a third light source, the third light guide plate is stacked on the first light guide plate and the second light guide plate, the third light guide plate has a third light incident surface, a third light exiting surface and a third bottom surface adjacent to the third light incident surface, and a plurality of third microstructures, the third microstructures are disposed on at least one of the third light exiting surface and the third bottom surface, and a distributed region of the third microstructures corresponds to the third light transmissive pattern, the third light source is disposed adjacent to the third light incident surface and is configured to emit a third light beam into the third light guide plate, and the third light beam is emerged from the third light guide plate by the third microstructures.

8. The display device according to claim 7, wherein the first light guide plate is disposed between the second light guide plate and the display panel, and the third light guide plate is disposed on a side of the second light guide plate away from the first light guide plate.

9. A display device, comprising a display panel and a backlight module, wherein:
   the display panel is disposed on a light exiting side of the backlight module, the display panel comprises a first display mode and a second display mode, the display panel displays a first light transmissive pattern in the first display mode, and the display panel displays a second light transmissive pattern in the second display mode;

the backlight module comprises:
- a first light guide plate, having a first light incident surface, a first light exiting surface and a first bottom surface adjacent to the first light incident surface, and a plurality of first microstructures, wherein the first microstructures are disposed on at least one of the first light exiting surface and the first bottom surface, and a distributed area of the first microstructures corresponds to the first light transmissive pattern;
- a second light guide plate, stacked on the first light guide plate and having a second light incident surface, a second light exiting surface and a second bottom surface adjacent to the second light incident surface, and a plurality of second microstructures, wherein the second microstructures are disposed on at least one of the second light exiting surface and the second bottom surface, and a distributed area of the second microstructures corresponds to the second light transmissive pattern;
- a first light source, disposed adjacent to the first light incident surface and configured to emit a first light beam into the first light guide plate, wherein the first light beam is emerged from the first light guide plate by the first microstructures; and
- a second light source, disposed adjacent to the second light incident surface and configured to emit a second light beam into the second light guide plate, wherein the second light beam is emerged from the second light guide plate by the second microstructures;

the display panel further comprises a third display mode, the display panel displays a third light transmissive pattern in the third display mode, the backlight module further comprises a third light guide plate and a third light source, the third light guide plate is stacked on the first light guide plate and the second light guide plate, the third light guide plate has a third light incident surface, a third light exiting surface and a third bottom surface adjacent to the third light incident surface, and a plurality of third microstructures, the third microstructures are disposed on at least one of the third light exiting surface and the third bottom surface, and a distributed region of the third microstructures corresponds to the third light transmissive pattern, the third light source is disposed adjacent to the third light incident surface and is configured to emit a third light beam into the third light guide plate, and the third light beam is emerged from the third light guide plate by the third microstructures; and the display device further comprises a control unit electrically connected to the display panel, the first light source, the second light source and the third light source, when switching to the first display mode, the control unit controls to turn on the first light source and turn off the second light source and the third light source; when switching to the second display mode, the control unit controls to turn off the first light source and the third light source and turn on the second light source, and when switching to the third display mode, the control unit controls to turn off the first light source and the second light source and turn on the third light source.

* * * * *